Sept. 15, 1925.　　　J. R. SMITH ET AL　　　1,553,839
FILM WINDING DEVICE
Filed Dec. 28, 1923　　2 Sheets-Sheet 1
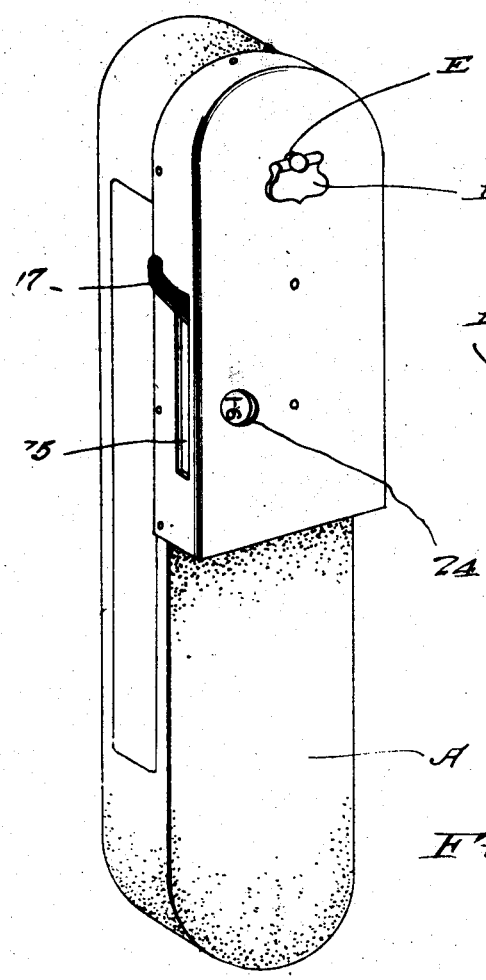
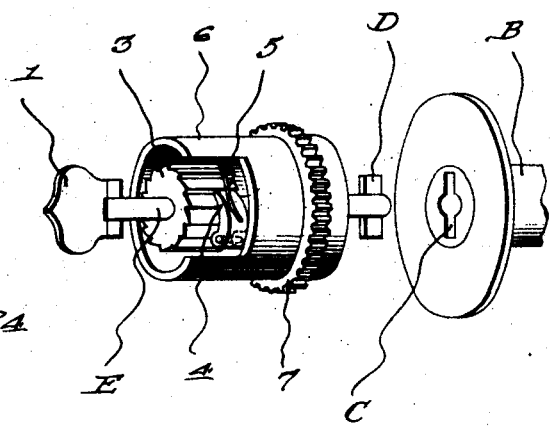
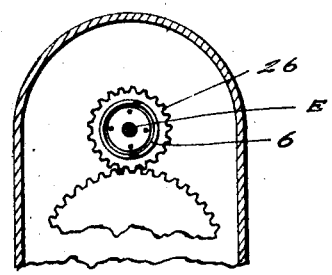
J. R. Smith
J. E. Sisk   INVENTORS
ATTORNEY
WITNESS:

Sept. 15, 1925.

J. R. SMITH ET AL 1,553,839

FILM WINDING DEVICE

Filed Dec. 28, 1923    2 Sheets-Sheet 2

J. R. Smith
J. E. Sisk
INVENTORS

ATTORNEY

Patented Sept. 15, 1925.

1,553,839

UNITED STATES PATENT OFFICE.

JESSE R. SMITH AND JOHN E. SISK, OF BENTON, ILLINOIS.

FILM-WINDING DEVICE.

Application filed December 28, 1923. Serial No. 683,216.

*To all whom it may concern:*

Be it known that we, JESSE R. SMITH and JOHN E. SISK, citizens of the United States, residing at Benton, in the county of Franklin and State of Illinois, have invented new and useful Improvements in Film-Winding Devices, of which the following is a specification.

This invention relates to photographic apparatus, particularly to cameras using rolls of film, and has for its object the provision of novel automatic means for the purpose of reeling the film mechanically and rapidly after each exposure so as to bring the next film into place without disturbing the position of the camera, the device having the great advantage of eliminating the usual slow hand winding necessary in the ordinary structure, in which a number on the film is observed through a red window.

An important and more specific object is the provision of a device of this character including a chain of gears which are operated by a manually actuated device and which act to drive the film carrying spool for winding the film, means being provided whereby compensation is made for the increase in the diameter of the film reel or roller as the film is wound thereonto, the parts being as simple as possible and arranged to put the minimum stress and wear on the driving member.

An additional object is the provision of a device of this character which will be simple and inexpensive in manufacture, easy to install and operate, efficient in action, durable in service and a general improvement in the art.

With the above and other objects and advantages in view the invention consists in the details of construction to be hereinafter more fully described and claimed and illustrated in the accompanying drawings, in which:

Figure 1 is a perspective view of a camera embodying our invention,

Figure 3 is a detail view of the winding mechanism, Figure 5 is a view similar to Figure 2 showing a modified winding mechanism and Figure 6 is a detail view of the modified winding element.

Figure 2:
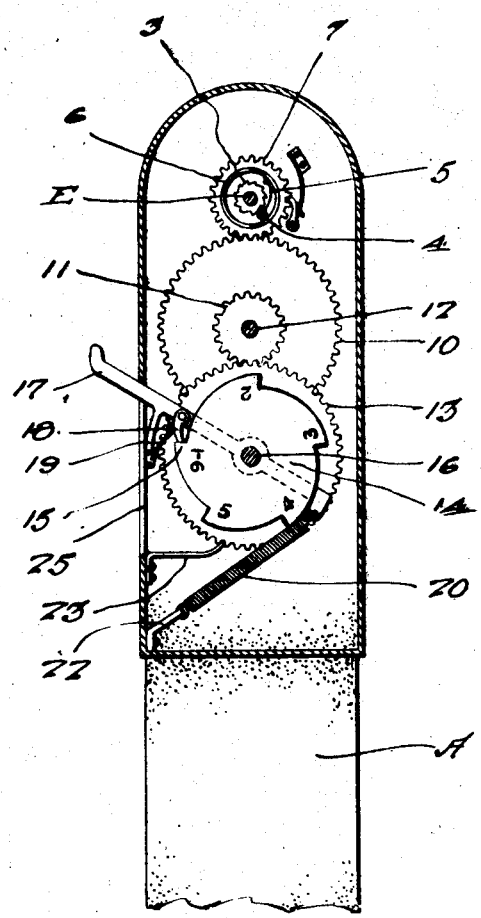
Figure 2 is a sectional view taken immediately beneath one side thereof and showing an elevation of the gears and other mechanism.

Referring more particularly to the drawings the letter A designates the body of a camera and B represents the spool or reel onto which the film is wound as the successive exposures are made. This spool is provided in its end with a slot C which ordinarily receives a lug D on the end of a pin or shaft E which carries a ring or handle 1 whereby the spool may be rotated to wind the film.

In carrying out the present invention we provide a small circular housing 6 which is half open or which is semi-cylindrical at the end adjacent the thumb key 1. In this housing is a notched or toothed cylinder 3 which is capable of turning in one direction and which is prevented from turning backwards by means of a pawl or dog 4 held in place by a spring 5. This pawl is located at the open side of the housing as shown. This housing 6 has formed or secured thereon a ring gear 7 with which meshes a relatively large spur gear 10 journaled on a shaft 12 on the camera body. As the gear 7 is of much less diameter than the gear 10 it is apparent that movement of the latter will cause relatively rapid movement of the former.

Mounted on the shaft 12 is a pinion 11 which in turn meshes with a relatively large gear 13 which is journaled on a shaft 16 likewise mounted on the camera body. Secured to the gear 13, or on the journal thereof, is a disk 14 formed in its periphery with a plurality of teeth 15 which are different distances apart to compensate for the increasing in diameter of the spool B as film is wound thereonto.

The above described parts are all located inside of the camera adjacent one wall thereof and this wall is formed with an opening 24 beneath which the disk 14 travels and adjacent the teeth 15 the disk is inscribed with numerals ranging from 1 to 6, which numerals are visible through the hole 24 as the mechanism is operated. There are only five teeth 15 whereas there must be six numerals for the reason that a roll of film is usually made for six exposures. The numerals 1 and 6 are disposed adjacent as shown for the first and last exposures.

Journaled on the shaft 16 is an elongated lever arm 17 the outer end of which is a manually operable handle which operates within a guide 25 which limits its movement and this lever and handle are normally held in one position by a spring 20 secured thereto and connected with an attaching bracket 22 mounted on the camera body. It should also be stated that we provide a pawl 23 for preventing retrograde movement of the gear 13. Pivoted on the lever 17 is a pawl 18 adapted to engage the teeth 15 and this pawl is engaged by a spring 19 which holds it in the proper operative position.

In the operation it is intended that the film be inserted in place in the camera with its free end threaded through the usual slit or slot in the spool B, after which the operator engages the handle end of lever 17 and moves it back and forth a few times to wind the film until it is in proper position for the first exposure. At this time the numerals 1 and 6 will be exposed through the opening 24 in the camera. After the first exposure is made, the operator grasps the handle end of the lever 17 which projects through the guide slot 25 in the camera, and pulls the handle to the limit of its movement. When this is done the engagement of the pawl 18 within the first notch causes the disk 14 and gear 13 to be rotated through an arc, and the gear 11 meshing with the gear 13 is consequently rotated, driving the gear 10 and gear 7 so that the spool B will be turned to wind the film. The numeral 2 is then exposed beneath the hole 24 and when pressure on the lever is relieved the spring 20 returns it to initial position. When the second exposure is made, the operator again pulls the lever which moves the disk and gear 13 another step so that the spool will be rotated to wind up the second section of exposed film and so on until all the exposures have been made. At the completion of the last exposure, the operator grasps the handle end of lever 17 and pulls it back and forth several times to wind up the long taper tail of the film.

Figure 6:
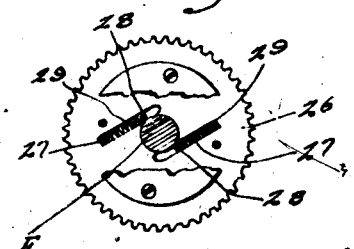

In Figures 5 and 6 we have illustrated a modified form of the winding mechanism which replaces the above described mechanism including the parts 3 to 7 inclusive. This winding device includes a gear 26 loosely mounted on the shaft E and formed with slots 27 which are tangent to the shaft. Within these slots are rollers 28 urged into engagement with the shaft by springs 29. When the shaft is turned by hand in the proper direction to wind the film, the rollers 28 are pushed back along the slots against the resistance of the springs 29, allowing the shaft E to turn freely without turning the gear 26. When power is applied to the gear by the mechanism above described it is apparent that the rollers 28 will engage firmly against the shaft E and cause it to be rotated with the gear. In every other respect the modified form of the device is the same as the first described form, the only difference being in this winding element which is simpler and less likely to get out of order than the other form.

From the foregoing description and a study of the drawings it will be apparent that we have thus provided a simply constructed and easily installed mechanical film winding device which avoids the objectionable features of the ordinary manual turning and which will therefore be a distinct step forward in the art.

While we have shown and described the preferred embodiment of our invention it is of course to be understood that we reserve the right to make such changes in the form, construction and arrangement of parts as will not depart from the spirit of the invention or the scope of the subjoined claims.

Referring to Fig. 2 it will be seen that shaft E turns counter-clockwise at each downward stroke of lever 17. The spool B, therefore, draws the film from the right in Fig. 2. Since photographic films are made to wind up with the sensitive face inward on the spool, it follows that said sensitive face is open toward the left in the camera of Fig. 2 and the left in said figure is the front of the camera, the right representing the back. The slot or guide 25 is, therefore, in the front face of the camera or casing and the lever or handle 17 projects forwardly of the front face.

This location of the outer end or handle of lever 17 is important when using the device, because it enables pictures to be taken in rapid succession with the camera properly braced. It is customary and preferable to take pictures with the back of the camera braced against the body of the operator. One hand works the shutter release while the camera is so braced. The other hand operates the winding mechanism. By alternately releasing the shutter and depressing the winding handle on 17 a whole roll of pictures can be taken in a very short time without the necessity of altering the position of the camera. This results from the location of the slot 25 in the front face adjacent to and parallel to the side wall, where the thumb of one hand can reach it without any bother, and the fingers can still help to hold the camera in braced position. Were it located on the side or rear of the camera, the latter would have to be removed from its braced position before winding. Consequently our construction permits a whole series of pictures of a subject to be taken in a correct manner in a few seconds so as to record rapidly changing phases in the subject.

Figure 4:
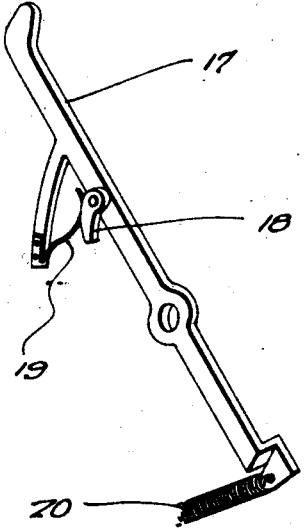
Figure 4 is a detail view of the lever.

Referring to Figs. 2 and 4, pawl 18 is located in the same plane as disk 14 and keeps in said plane throughout its movement. This permits a more compact structure than would be the case if the pawl moved out of the plane, thus forcing a thicker casing. This is important, because the space which can be allotted to a winding mechanism in film cameras is very small. Moreover, by moving pawl 18 in the same plane as disk 14, the driving stresses have less tendency to twist the pawl or to wear out the engaging faces of the pawl and teeth. In other words, the construction is rugged for use by unskilled persons who customarily employ roll film cameras of this type.

While we have shown five teeth on disk 14, it will be obvious that the number can be varied if films are to be wound having more or less exposure areas than the usual six exposure rolls. In any event, the arc through which pawl 18 moves is always greater than the largest arc between any two consecutive teeth of the differentially spaced series and less than the smallest arc between two alternate teeth of the series.

By pivoting lever 17 well within the casing, it is protected against bending and breaking when the camera is being carried. Only the handle part of it, which is much less than half of it, projects outside, even during the middle of the stroke. In its initial or normal position, shown in Fig. 1, only a little end of it projects at an acute angle which brings it close to said face. It is also braced by the guiding walls of slot 25. Moreover by projecting outward and forward so that it passes through a horizontal position during the middle of its stroke, it can be operated wholly by vertical force applied say for example by the thumb of the operator sliding along the front face of the camera. The operator can, therefore, find and operate the winding lever, without even looking for it, thus freeing his vision for watching the subject in the finder, as is necessary when making rapidly repeated exposures.

We claim:

1. In combination with the film winding spool of a camera, a gear on the spindle of the spool, a large gear meshing therewith, a pinion concentric and movable with said second named gear, a gear meshing with said pinion, a ratchet disk movable with said last named gear and having teeth on its periphery at decreasing peripheral distances in the direction of its movement, a detent pawl for preventing retrograde movement of the last named gear, a lever having its free end operating through a guide slot at the front of and parallel to the side wall of the camera body, a spring for holding said trigger normally at one limit of its movement, a spring pressed pawl on said lever bearing against the periphery of said ratchet disk to engage said teeth.

2. A roll-film camera including a casing for winding mechanism at one side thereof, the outer wall of the casing being parallel to a side wall of the camera and the front wall of the casing being a continuation of the front wall of the camera, said front wall of the casing having a slot parallel to and between the outer wall of said casing and the nearest side wall of the camera, a lever pivoted in said casing and having a handle extending through and oscillating in said slot, means for transmitting rotation to a film spool in said camera, and connections between said means and said lever for imparting rotation to said means at each oscillation of said handle, whereby the operator can oscillate said handle and wind the film while the back of the camera is braced against his body.

3. A roll-film camera having in the front wall thereof a slot adjacent to and parallel to a side wall thereof, a lever having a handle extending out through and oscillating in said slot, a rotary disk parallel to said side wall having a series of teeth on its outer periphery differentially spaced, a pawl on said lever which, at each oscillation of said handle, moves in the same plane as said disk through an arc greater than the largest arc between any two consecutive teeth of the series but less than the smallest arc between any alternate pair of teeth of the series, the end walls of said slot confining the oscillations of said handle within such limits, said pawl being spring-pressed toward said disk, means for transmitting rotation to a film-spool in said camera and connections between said means and said disk for imparting rotation from the latter to the former, whereby the operator may wind up a measured length of film by pressing the handle while the back of the camera is braced against his body.

4. A roll-film camera as set forth in claim 3, in which the handle is spring-pressed toward the end of the slot from which the driving stroke of the handle begins, the mechanism for one complete cycle of operation requiring only a manual driving stroke of the handle from said end of the slot to the other end.

5. A roll-film camera comprising a lever having a handle extending forwardly in front of the camera adjacent a side thereof during its entire operative stroke, a rotary disk having differentially spaced teeth at its outer periphery, a pawl operated by said lever to engage said teeth and drive said disk, said pawl moving entirely in the plane of said disk, means for transmitting rotation to a film spool in said camera, and connections between said means and said disk for imparting rotation from the latter to the former.

6. A roll-film camera comprising a lever fulcrumed therein and part of it extending beyond the front face thereof in position to be moved manually by pressure adjacent to and along said face, the handle end of said lever being at an acute angle to said face and adjacent thereto when in its initial position, means for transmitting rotation to a film spool in said camera, and connections between said means and said lever for imparting rotation to said means at each actuation of said handle.

7. A roll-film camera comprising a lever mounted therein to move through an operating angle, one end of said lever projecting as a handle outside of the camera casing beyond the front face thereof in position to be moved through said angle by vertical manual pressure when the lens axis of the camera is horizontal, a rotary ratchet disk having differentially spaced teeth on its outer periphery, the plane of said disk being parallel to the plane in which said lever moves, a pawl operated by said lever to engage each of said teeth in succession to drive said disk, said pawl moving in the plane of the disk into and out of engagement with said teeth, means for transmitting rotation to a film spool in said camera, connections between said means and said disk for imparting rotation from the latter to the former.

In testimony whereof we affix our signatures.

JESSE R. SMITH.
JOHN E. SISK.